April 8, 1924.

W. W. GALLEMORE

PNEUMATIC TIRE

Filed Oct. 26, 1921

Inventor
W. W. Gallemore
By McCracken & Patch
his Attorneys

Patented Apr. 8, 1924.

1,489,432

UNITED STATES PATENT OFFICE.

WILLIAM W. GALLEMORE, OF MENDON, ILLINOIS.

PNEUMATIC TIRE.

Application filed October 26, 1921. Serial No. 510,446.

*To all whom it may concern:*

Be it known that I, WILLIAM W. GALLEMORE, citizen of the United States, residing at Mendon, in the county of Adams and State of Illinois, have invented certain new and useful Improvements in Pneumatic Tires, of which the following is a specification.

This invention relates to pneumatic tires, and particularly to a pneumatic tire for use upon automobiles and in other like connections.

An object is to provide a tire which is made resilient through the use of a combination of pneumatic and spring elements.

A further object resides in so constructing the tire that the strain under weight is more or less evenly distributed upon the entire pneumatic structure, and that the spring portions function to give added strength and resiliency.

A still further object lies in providing a tire which can be fitted for use upon standard sizes and shapes of wheels and rims, and which will conform to present standards in every way.

Another object is to provide a tread element which can be renewed and to so construct the parts that when the various elements are associated for use they will hold in place and will guard against the ingress of water and dirt and the like to injure the inner pneumatic structure.

With these and other objects in view which will be apparent from the drawing, specification and claims, this invention includes certain novel features of construction and combinations of parts which will now be set forth.

Figure 1:
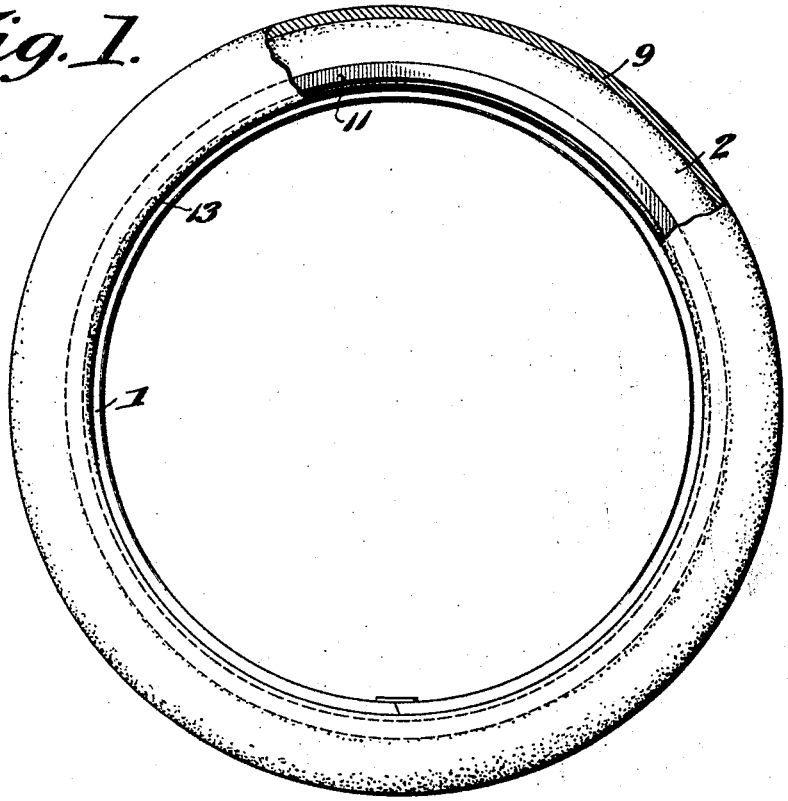
Figure 1 is a view in elevation of a tire constructed in accordance with my invention and with portions of the outer casing shown in section.
Figure 2:
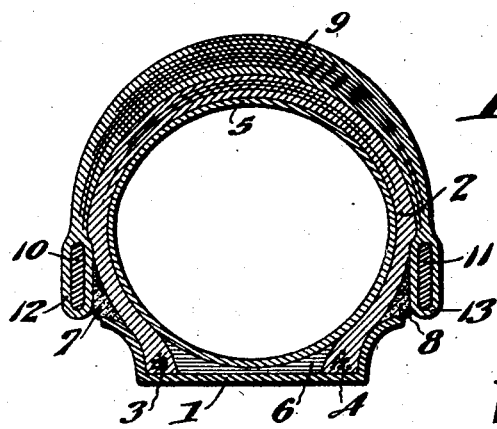
Fig. 2 is a transverse sectional view through my improved tire and rim on which it is fitted.

The rim 1 is of the clincher, straight-sided, or any other desired type, and is detachable from or permanently affixed upon a wheel. The rim and wheel structures will be standard, and in the present instance I have illustrated the rim 1 as being of the straight-sided detachable type only for convenience in showing one adaptation of my invention.

An inner casing 2, which can be built up of rubber impregnated fabric or of any suitable material, is shaped at its edges 3 and 4 to fit the rim 1. The edges of the inner casing are preferably made with the usual bead or reinforcing wires to give the structure a better grip upon the rim, although in some instances it may not be necessary to use these. A tube 5 is provided to be inflated within the inner casing 2, and a filler 6 is provided at the rim, or the inner casing might be shaped at its edges to dispense with this filler.

This inner casing is made of a smaller diameter than a standard casing for each particular rim size, and is slightly wider, thus giving a substantially equivalent internal cubical content. Through its greater width this inner casing overhangs slightly at each side of the rim 1, and between the overhanging portion and each side of the rim the cushion rings 7 and 8 are provided on the sides of the casing, these being of rubber or other suitable material or composition.

An outer casing, generally indicated at 9, is constructed upon the spring steel rings 10 and 11, which are of substantially the same diameter as the cushion rings 7 and 8. The outer casing is built up of layers of fabric or in any other suitable manner to be substantially crescent shaped in cross section with the spring rings 10 and 11 at its sides, and this casing is of a size to fit snugly over inside casing 2 to present the edge portions 12 and 13 in which the spring rings are incorporated against the cushion rings 7 and 8. This outer casing is made of an outside diameter corresponding to a standard casing to thus conform to present tire size calculations. While I have mentioned only fabric as being used in the construction of this casing, cord, metal fabric or cable, and in fact any reinforcing and strengthening material can be employed, a purpose being to provide an outer casing which will stretch but little and which will resist the usual wear and shocks.

In the use of my improved tire the parts are assembled and fitted as shown and the tube 5 is inflated. This inflation of the tube expands casing 2 within the outer casing 9 and forces the cushion rings 7 and 8 against the edges 12 and 13 of the outer casing to establish a water proof joint. The edges 3 and 4 of the inner casing hold frictionally within rim 1 and the inflation of tube 5 causes the casing 2 to hold frictionally within casing 9. As a load is placed upon any part of the tire this is borne by the outer casing 9 and through the spring rings 10 and 11 is distributed to all parts of this casing. The usual stretching and straining of the upper portion of a tire due to displacement of air in the lower portion where the weight is borne between the wheel rim and the roadway is here obviated as the outer casing 9 is free to give as an entirety and is reinforced and held against stretching by the rings 10 and 11. Due to the fact that the sides 12 and 13 of the outer casing overhang the sides of the rim, all danger of rim cutting is obviated, and through the reinforcement given by rings 10 and 11 the tire is rendered proof against blow outs at the sides.

By constructing the tire as herein described the standard sizes and calculations for standard practice are conformed to in every way, the tube 5 can be of usual size and will carry the usual volume of air, and in fact my tire will be in size and appearance of substantially standard form with the exception that it is slightly wider adjacent the rim and that the edges 12 and 13 of the casing overhang the rim.

While, in the foregoing, I have described specific embodiments, and have mentioned only certain possible modifications, it will be appreciated that in practice I do not wish to limit myself to such specific details as herein set forth, but may resort to any practical modifications falling within the scope of the invention as defined in the appended claims.

I claim:

1. A pneumatic tire comprising, an inner casing to be fitted on a rim and overhang the edges thereof, a tube to inflate said casing, an outer casing fitted upon the inner casing to cover the tread and sides thereof and overhang adjacent the rim, and means carried by the inner casing to hold the edges of the outer casing out from contact with the edges of the rim.

2. A pneumatic tire comprising, an inner casing to be mounted on a rim and overhang the edges thereof, a tube to inflate the inner casing, an outer casing fitted upon the inner casing to cover the tread and sides thereof and overhang adjacent the edges of the rim, reinforcing rings incorporated in the edges of the outer casing, and cushion rings on the sides of the inner casing adjacent the rim to receive and spread the edges of the outer casing to clear the edges of the rim.

In testimony whereof I affix my signature.

WILLIAM W. GALLEMORE.